US008880776B2

(12) United States Patent
Shen et al.

(10) Patent No.: US 8,880,776 B2
(45) Date of Patent: Nov. 4, 2014

(54) DATA ACCESS AT A STORAGE DEVICE USING CLUSTER INFORMATION

(75) Inventors: Eran Shen, Naharyia (IL); Boris Dolgunov, Ramat-Gan (IL)

(73) Assignee: Sandisk IL Ltd., Kfar Saba (IL)

( * ) Notice: Subject to any disclaimer, the term of this patent is extended or adjusted under 35 U.S.C. 154(b) by 1236 days.

(21) Appl. No.: 12/336,375

(22) Filed: Dec. 16, 2008

(65) Prior Publication Data

US 2010/0153673 A1  Jun. 17, 2010

(51) Int. Cl.
| | | |
|---|---|---|
| *G06F 12/00* | (2006.01) | |
| *G06F 21/80* | (2013.01) | |
| *G06F 21/85* | (2013.01) | |
| *H04L 29/06* | (2006.01) | |
| *G06F 12/02* | (2006.01) | |
| *G06F 12/14* | (2006.01) | |

(52) U.S. Cl.
CPC .............. *G06F 21/85* (2013.01); *H04L 63/102* (2013.01); *G06F 21/80* (2013.01); *G06F 12/023* (2013.01); *G06F 2221/2149* (2013.01); *G06F 12/1433* (2013.01); *G06F 12/0246* (2013.01)
USPC .................. 711/103; 711/170; 711/E12.008; 711/203

(58) Field of Classification Search
CPC ............ G06F 12/0238; G06F 12/0246; G06F 12/0868; G06F 12/0859; G06F 21/80
See application file for complete search history.

(56) References Cited

U.S. PATENT DOCUMENTS

| | | | |
|---|---|---|---|
| 6,058,390 A | | 5/2000 | Liaw et al. |
| 7,350,049 B1 * | | 3/2008 | Li et al. .......................... 711/170 |
| 2003/0065866 A1 * | | 4/2003 | Spencer ........................ 710/306 |
| 2005/0060513 A1 * | | 3/2005 | Maeda et al. .................. 711/172 |
| 2006/0047920 A1 * | | 3/2006 | Moore et al. ................... 711/154 |
| 2007/0002612 A1 | | 1/2007 | Chang et al. |
| 2007/0033362 A1 | | 2/2007 | Sinclair |
| 2007/0033373 A1 | | 2/2007 | Sinclair |
| 2007/0143532 A1 | | 6/2007 | Gorobets et al. |
| 2007/0143571 A1 | | 6/2007 | Sinclair et al. |
| 2008/0082773 A1 | | 4/2008 | Tomlin et al. |
| 2009/0006866 A1 * | | 1/2009 | Chang ............................ 713/193 |
| 2009/0132623 A1 * | | 5/2009 | Cho et al. ....................... 707/206 |
| 2010/0005227 A1 * | | 1/2010 | Nakanishi et al. ............. 711/103 |
| 2010/0070544 A1 * | | 3/2010 | Gopalan et al. ............... 707/822 |

* cited by examiner

*Primary Examiner* — Matthew Bradley
*Assistant Examiner* — Arvind Talukdar
(74) *Attorney, Agent, or Firm* — Toler Law Group, PC

(57) ABSTRACT

Systems and methods for accessing data at a data storage device are disclosed. In a particular embodiment, a method includes receiving cluster information at a controller of a data storage device, the data storage device further including a memory, the cluster information being associated with a data file that is stored at the memory. The method also includes accessing the cluster information to locate at least one region of the memory corresponding to the data file. The method further includes accessing data from the data file at the at least one region of the memory that is identified by the cluster information. Accessing of data from the data file includes the controller executing an internal application.

21 Claims, 4 Drawing Sheets

DATA ACCESS AT A STORAGE DEVICE USING CLUSTER INFORMATION

FIELD OF THE DISCLOSURE

The present disclosure is generally related to accessing data at a storage device using file system cluster information.

BACKGROUND

Non-volatile memory devices, such as universal serial bus (USB) flash memory devices or removable storage cards that hold data between power cycles, have allowed for increased portability of data and software applications. An increasing number of electronic devices, such as consumer electronic devices, are adapted to interact with non-volatile memory devices. In some circumstances it may be desired to control access to data stored in non-volatile memory devices, such as to enforce a security policy or a distribution policy regarding the data.

SUMMARY

Systems and methods to access data at a data storage device are disclosed. An internal application at the data storage device may access cluster information stored at the data storage device to locate different fragments of a file distributed in the storage device.

In a particular embodiment, a method for accessing data at a data storage device is disclosed. The method includes receiving cluster information at a controller of the data storage device. The data storage device includes a memory. The cluster information is associated with a data file that is stored at the memory. The method also includes accessing the cluster information to locate at least one region of the memory corresponding to the data file. The method further includes accessing data from the data file at the at least one region of the memory that is identified by the cluster information. The controller executes an internal application that accesses the data.

In another embodiment, a data storage device is disclosed that includes an interface, a memory, and a memory controller coupled to the memory and to the interface. The memory controller is configured to receive, via the interface, cluster information associated with a data file stored at the memory. The memory controller is further configured to execute an internal application to access data from the data file at a region of the memory identified by the received cluster information.

In another embodiment, a system is disclosed that includes a memory controller that is configured to receive cluster information associated with a data file stored at a memory and to access data from the data file at a region of the memory that is identified by the received cluster information. An internal application is executed by the controller to access the data from the data file.

DETAILED DESCRIPTION

Figure 1:
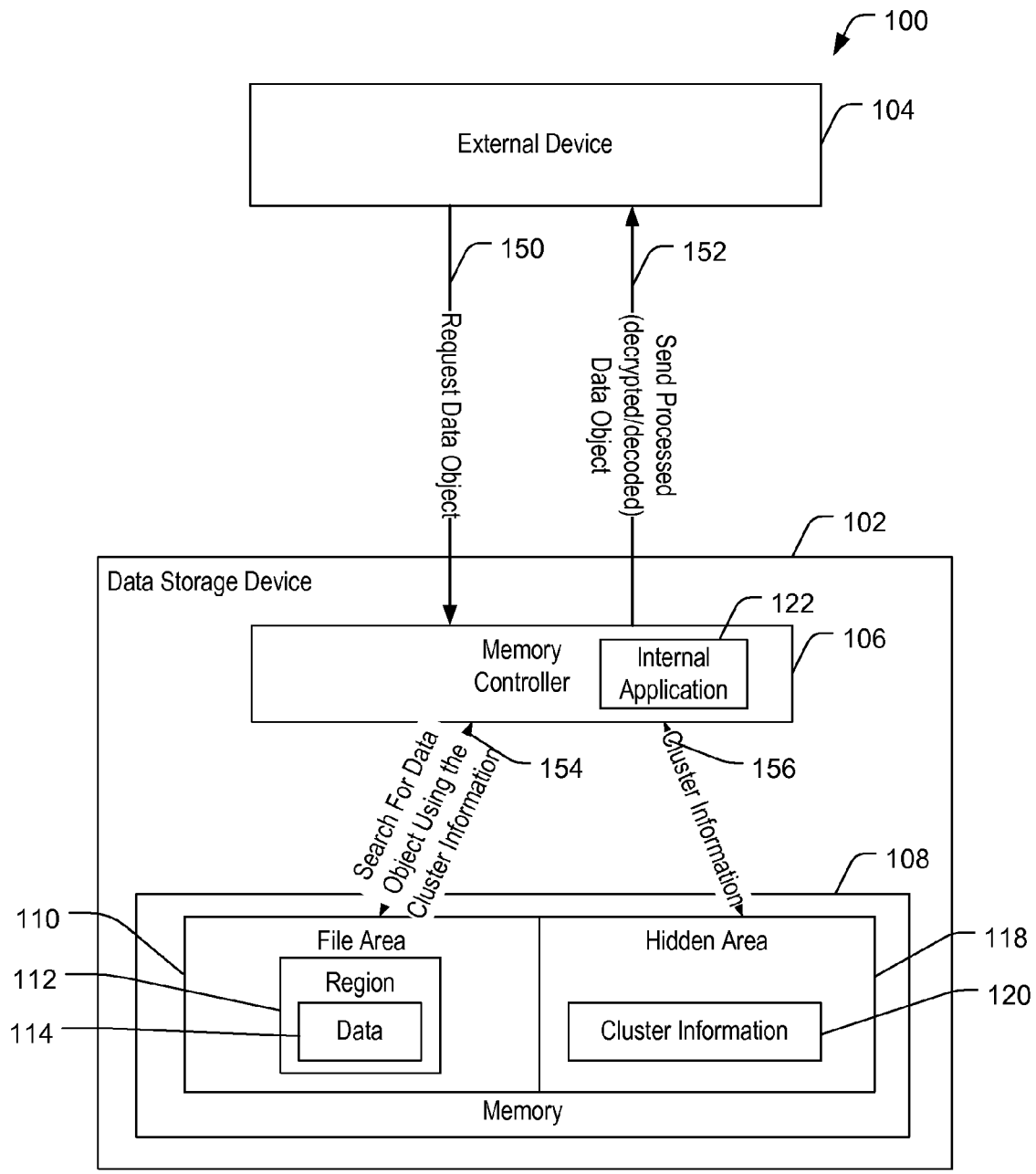
FIG. 1 is a block diagram of a particular embodiment of a system to access data at a data storage device.

Referring to FIG. 1, a particular embodiment of a system 100 is illustrated. The system 100 includes a data storage device 102 and an external device 104. The data storage device 102 includes a memory controller 106 and a memory 108. The memory controller 106 executes an internal application 122 and has read and write access with respect to the memory 108. The memory 108 includes a hidden area 118 that cannot be accessed through an external interface and includes a public area 110 where data is stored in a file format. The public area 110 includes multiple regions of files, such as the illustrated region 112 including data 114. In a particular embodiment, the memory 108 is a non-volatile memory, such as a flash memory (e.g., NAND, NOR, Multi-Level Cell (MLC), Divided bit-line NOR (DINOR), AND, high capacitive coupling ratio (HiCR), asymmetrical contactless transistor (ACT), or other flash memories), an erasable programmable read-only memory (EPROM), an electrically-erasable programmable read-only memory (EEPROM), a read-only memory (ROM), a one-time programmable memory (OTP), or any other type of memory.

In a particular embodiment, the memory controller 106 is coupled to the memory 108 and is coupled to an interface to the external device 104. The memory controller 106 is configured to receive, via the interface, cluster information associated with a data file stored at the memory 108. For example, the memory 108 may store representative data 114 in a data file. The memory controller 106 is further configured to execute the internal application 122 to access the data 114 at the region 112 of the memory 108 as identified by the received cluster information 120. In a particular embodiment, the cluster information 120 may be received from the external device 104, or in another embodiment, the cluster information 120 may be pre-loaded and stored into the memory device 108.

During operation, the external device 104, such as a host personal computer (PC) or another type of host device, such as a cell phone or similar wireless electronic device, sends a request for a data object 150 to the memory controller 106. The memory controller 106 performs a search operation 154 of the memory 108. The search operation 154 may include a search for a data object where the data object is identified and located based on cluster information, such as the cluster information 120.

The internal application 122 within the memory controller 106 can receive, via cluster information request 156, cluster information previously stored within the hidden area 118, as shown as the cluster information 120. The internal application 122, upon receipt of the cluster information 120, can step through the cluster information 120 such as stepping through a linked list of cluster address information, and the memory controller 106 can in turn identify specific data, such as the illustrated data 114 within the memory 108. The cluster information 120 identifies a particular set of clusters, such as a set of clusters that store data of a particular data file, but the cluster information does not represent an entire file system. For example, the cluster information 120 may include cluster data for only one file of multiple files that may be stored at the public area 110. Upon identification of a particular region, such as region 112, and the specified data, such as the data 114, the memory controller 106 retrieves the requested data object (e.g. data 114) and can return the requested data object to the external device 104.

The memory controller 106, upon receipt of the requested data object, through use of the internal application 122 and the cluster information 120, may also process the data prior to delivering processed data to the external device 104. For example, the memory controller 122 is configured to process accessed data and to send the processed data to the external device 104 in response to receiving a memory request, such as a memory read request, from the external device 104. In a particular embodiment, the memory request from the external device 104 identifies the data object but does not identify an address of the data object. The memory controller 106 is configured to access the cluster information 120 to locate the region 112 of the memory 108 and the memory controller is configured to search the region 112 of the memory 108 to locate the particular data object, such as the illustrated data 114. For example, the cluster information 120 may identify one or multiple regions of the memory for the internal application 122 to search to locate the data object, such as a set of clusters associated with a data file that stores the data object. The internal application 122 may search through the region or multiple regions to locate the data 114.

In a particular embodiment, the memory controller 106 is implemented as a data processor that is configured to process data accessed from the memory 108 and to send the processed data to the external device 104. The processed data may include decrypted data, decoded data, or a combination thereof. In a particular embodiment as shown in FIG. 1, the memory 108 includes the public area 110 and the hidden area 118. The public area 110 is accessible to the external device 104, but the hidden area 118 is inaccessible to the external device 104. The memory controller 106 is operable to store the cluster information 120 within the hidden area 118. In addition, the memory controller 106 is operable to retrieve the cluster information 120 stored within the hidden area 118. After accessing the data 114 and processing the data 114 within the internal application 122, the memory controller 106 then sends processed data 152 to the external device 104.

In a particular embodiment, the memory controller 106 is configured to identify a particular data request pattern that corresponds to at least one data request from the external device 104 where the data request pattern indicates an error condition. An example of an error condition is an unauthorized data access attempt. For example, where the data 114 includes multimedia data, the external device 104 may request multimedia content without having the appropriate subscription access. For example, the external device 104 may be owned by a user that has not purchased rights to access the particular multimedia data stored as the data 114.

In another example, the external device 104 may be a navigation device that has requested data that is unauthorized with respect to the internal application 122. As an example, the external device 104 may send a hacker-type request that is mimicking a data request from a valid navigation device. With the hacker-type request, the external device 104 may request data that is outside the boundaries of a particular map or within a map area that is associated with coordinates that are unlikely to be requested, such as locations on the map without roads or other vehicle access. Thus, the memory controller 106 may provide error detection functionality and identify various data patterns associated with representative error conditions.

By storing the cluster information 120 in the hidden area 118 and by using the cluster information 120 to locate and decode or decrypt data at the public area 110, the internal application 122 enables the data storage device 102 to receive requests, such as a request for the data object 150, and to send the processed data 152 to the external device 104 without implementing an internal file system at the data storage device 102. In addition, by using a request for data object 150 that is understood by the internal application 122 and that is processed by the internal application 122 based on the cluster information 120 to locate portions of the data file, the memory controller 106 enables data access and retrieval to an external device 104 in a manner that is independent of a file system type of the external device 104.

For example, the external device 104 may use a first type of file system and may provide a request for the data object 150 that is processed by the internal application 122 to return the processed data 152. The data storage device 102 may be de-coupled from the first external device 104 and coupled to a second external device (not shown) which in turn may provide a similar request for the data object which is processed by the internal application 122 and results in the processed data object being returned, independent of a file system of the second external device. By enabling access to files and data in the public area 110 of the memory 108 without requiring the additional overhead of maintaining an internal file system at the data storage device 102, the internal application 122 enables file system agnostic access and enhanced processing capability.

Figure 2:
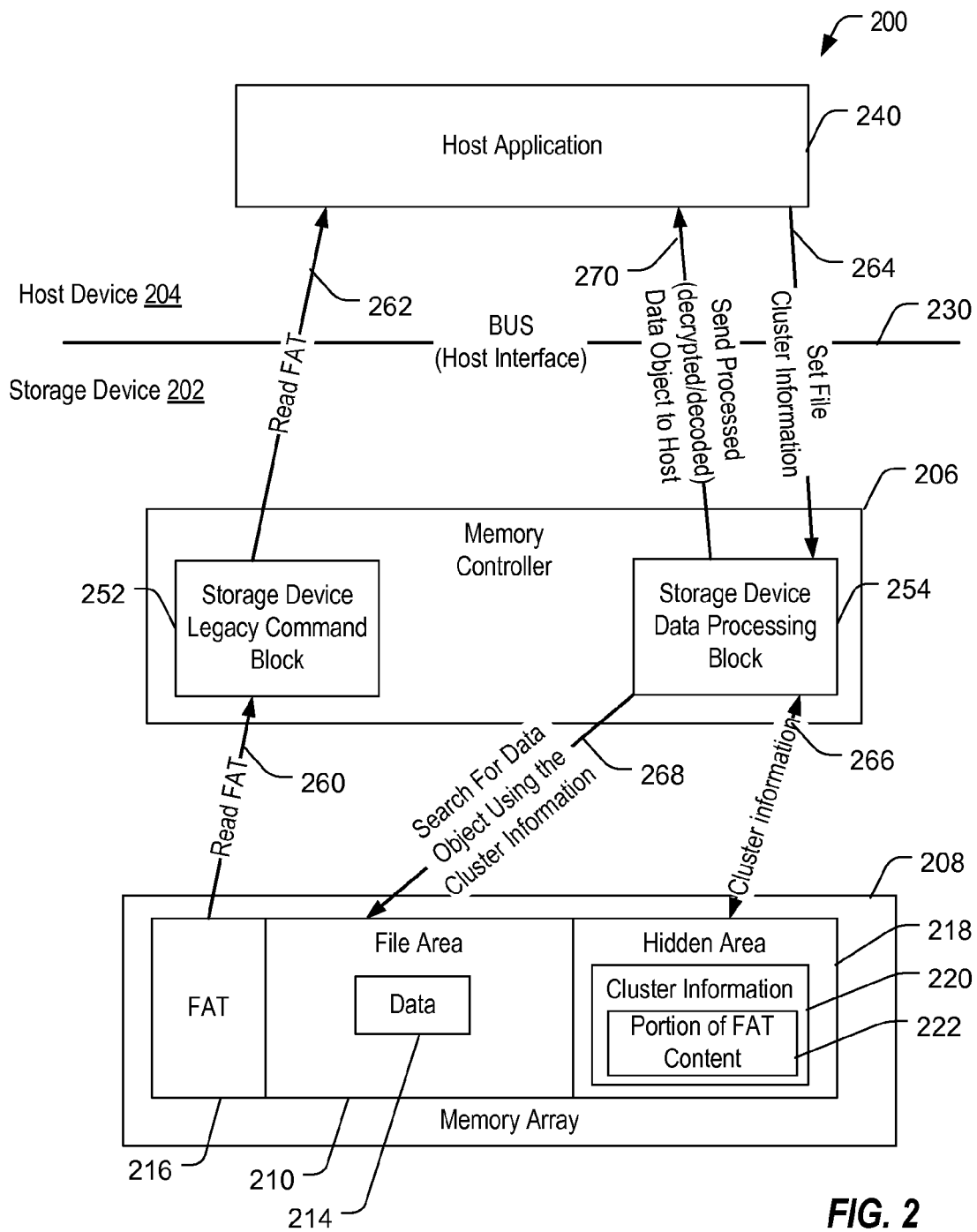
FIG. 2 is a block diagram of a second particular embodiment of a system to access data at a data storage device.

Referring to FIG. 2, a particular illustrative embodiment of a system 200 is depicted. The system 200 includes a host device 204 coupled to a storage device 202 via a bus 230. The host device 204 executes a host application 240. The storage device 202 includes a memory controller 206 and a memory array 208. The memory controller 206 is configured to execute storage device legacy commands at a storage device legacy command block 252. For example, a legacy read command can indicate a starting logical block address (LBA) and a size of the data to be retrieved, and a legacy write command can indicate a starting LBA and the data to be written. In addition, the memory controller 206 is configured to execute storage device data processing commands, via a storage device data processing block 254. The memory array 208 includes a public area that includes a File Allocation Table (FAT) 216 and a public file area 210, and a hidden area 218. In a particular embodiment, the storage device 202 may be the data storage device 102 of FIG. 1.

In a particular embodiment, the FAT 216 of the memory array 208 includes a table identifying clusters of the public file area 210, such as a FAT-16 or FAT-32 implementation. The FAT 216, for example, may identify a series of clusters that correspond to a particular data file in the public file area 210 that may include a specific portion of data 214. In general, a data file stored in the public file area 210 may span multiple clusters of the public file area 210, and the portions spanned by the data file may not be consecutive. Thus, the FAT 216 provides information of a sequential order of potentially non-consecutive locations within the public file area 210 that corresponds to a particular data file.

In a particular embodiment, the hidden area 218 is a portion of the memory array 208 that is accessible only to the memory controller 206 and that is not accessible to the host application 240. The hidden area 218 stores cluster information 220 corresponding to one or more particular data files that are stored in the public file area 210. The cluster information 220 includes a portion 222, but not all content, of the FAT 216. Thus, the cluster information 220 includes certain file system information, but is independent of any particular file system implementation.

During operation, the host device 204 may request to read the FAT 216 using legacy commands. The legacy command to read the FAT 216 may be received at the data storage legacy command block 252 and may result in the storage device legacy command block 252 receiving read FAT data 260. The storage device legacy command block 252 may send the host application read FAT data 262. The FAT data 260 and 262 may include a copy of the FAT 216 to be provided to the host application 240 in response to the legacy command to read the FAT 216.

The host application 240, upon receiving the read FAT data 262, may identify a sequence of clusters from the read FAT data 262 corresponding to a particular data file that stores the data 214 to be retrieved by the host application 240. The host application 240 may send the cluster information corresponding to the particular data file to access the data 214 via a set file cluster information command 264 that is sent to the memory controller 206 and received at the storage device data processing block 254. The storage device data processing block 254 may store the received cluster information as the cluster information 220 at the hidden area 218 of the memory array 208. The host application 240 may subsequently send a command to request access to the data 214 that is stored at the file area 210 of the memory array 208. The request to access the data 214 may identify the data file or a data object within the data file, but the request does not identify a memory address corresponding to the data file. The storage device data processing block 254, in response to the request from the host device 204, may retrieve the cluster information 220 from the hidden area 218. The storage device data processing block 254 may use the retrieved cluster information 220 to conduct a search 268 for the requested data object at the public file area 210 using the cluster information 220. The storage device data processing block 254 may search the regions of memory identified by the cluster information 220 until the requested data object is found. The storage device data processing block 254 may process the data 214, such as by decoding or decrypting the data 214, and may send a processed data object 270, such as decoded or decrypted data corresponding to data 214, to the host device 204.

Since the FAT 216 at the storage device 202 and the public file area 210 are accessible via legacy commands, the host application 240 is able to read the FAT 216 and generate the cluster information 220 corresponding to a particular file of interest to the host application 240. The host application 240 may provide the cluster information 220 to the memory controller 206 which uses the cluster information 220 to respond to data access requests from the host application 240 via the storage device data processing block 254. Therefore, the host application 240 can access the data 214 without having prior knowledge of the cluster information 220 prior to being coupled to the storage device 202. In addition, different host applications 240 may provide different cluster information 220 to the memory controller 252 based on which particular file of the public file area 210 stores data that is related to the host application 204.

Figure 3:
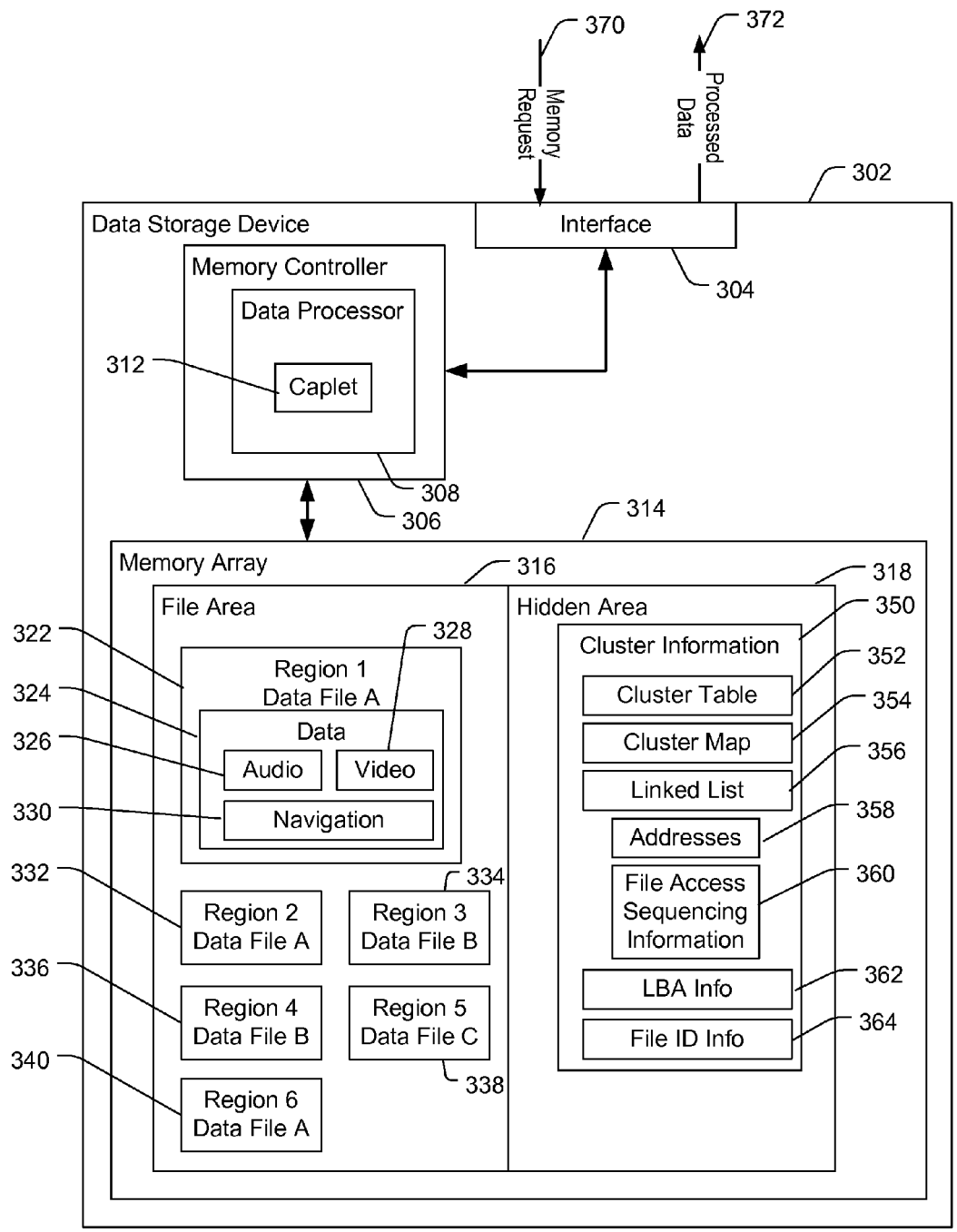
FIG. 3 is a block diagram of a particular embodiment of a data storage device.

Referring to FIG. 3, a particular embodiment of a data storage device 302 is depicted. In a particular embodiment, the data storage device 302 may be the data storage device 102 of FIG. 1. The data storage device 302 includes an interface 304 coupled to a memory controller 306. The memory controller 306 is coupled to a memory array 314.

In a particular embodiment, the interface 304 may receive a memory request 370 from an external device, such as a host device. The interface 304 is configured to provide the received memory request 370 to the memory controller 306. The interface 304 is also configured to receive processed data from the memory controller 306 and to send processed data 372 to the external device.

The memory controller 306 includes a data processor 308 that is configured to execute one or more internal applications, illustrated as a memory card internal storage application (caplet) 312. The internal storage application 312 is executable by the data processor 308 to be responsive to data access requests that identify a data object at the memory array 314 but that do not provide an address to the data object.

The memory array 314 includes a public area 316 where data is stored in a file format and a hidden area 318. The public area 316 stores a first data file ("Data File A") that spans multiple consecutive and non-consecutive clusters of the public area 316. For example, Data File A may include a first block at a first region 322 of the public area 316 that may correspond to a cluster or a logical division of the public area 316. Data 324 is stored within the first region 322. The data 324 may include audio data 326, video data 328, or navigation data 330, as illustrative, non-limiting examples of types of data that may be stored in Data File A. As an example, the navigation data 330 may include map data, route data, other data to aid in navigation, or any combination thereof. Data File A also includes a second block at a second region 332 and a third block at a sixth region 340. Interspersed between the blocks of Data File A are blocks of a second data file ("Data File B") at a third region 334 and at a fourth region 336 and a block of a third data file ("Data File C") at a fifth region 338. A File Allocation Table (FAT), which may be stored at the pubic area 316 or stored externally to the data storage device 302, may include information to enable an operating system to locate and concatenate the particular blocks of each data file for a requesting application.

The hidden area 318 of the memory array 314 may be accessible only to the memory controller 306 and may include cluster information 350. The cluster information 350 may be received via an external device, such as from a host device, and may identify one or more regions of the public area 316 corresponding to a data file. For example, the cluster information 350 may identify the first region 322, the second region 332, and the sixth region 340, for Data File A. The cluster information 350 may include a cluster table 352, a cluster map 354, or a linked list of clusters 356. For example, the linked list 356 may include one or more addresses 358 of the memory and file access sequencing information 360 indicating an order of access of the addresses 358 for sequential access to the data file. The cluster information 350 may, alternatively or in addition, include logical block address (LBA) information 362 and file identification information 364.

During operation, the internal storage application 312 may respond to the memory request 370 by accessing the cluster information 350 to locate one or more regions of the public area 316 corresponding to a particular data file, such as the first region 322, the second region 322, and the sixth region 340 corresponding to Data File A. The internal storage application 312 may search the located regions for a data object requested by the memory request 370, such as for a portion of the audio data 326 corresponding to a song title received via the request 370. The internal storage application 312 may be configured to process the data object, such as by decoding or decrypting the data, and to provide the processed data 372 to the requesting external application.

Figure 4:
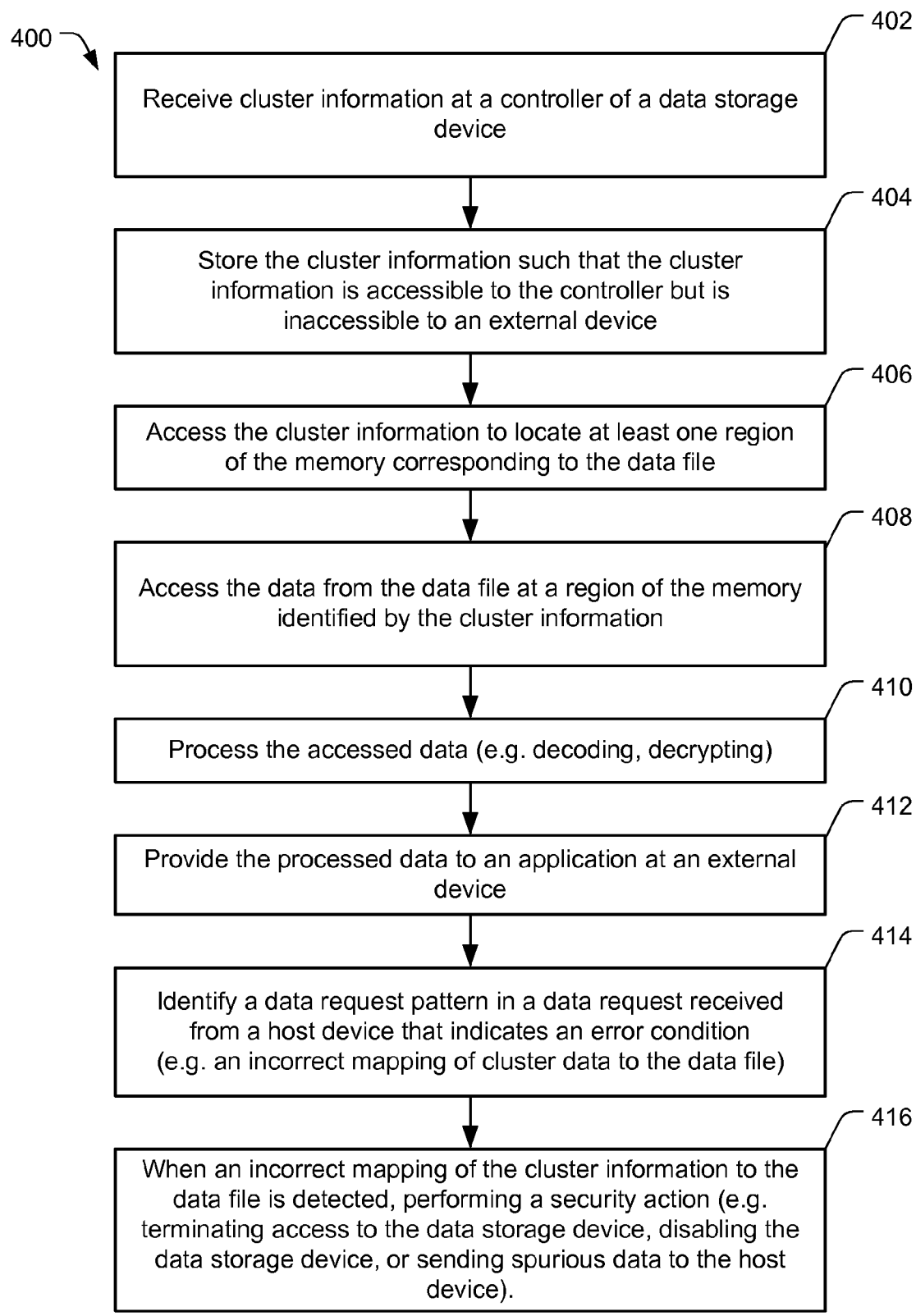
FIG. 4 is a flow diagram of a particular embodiment of a method to access data at a data storage device.

FIG. 4 illustrates a particular embodiment of a method for accessing data at a data storage device. The method 400 includes receiving cluster information at a controller of a data storage device, at 402. The data storage device includes a memory and the cluster information is associated with a data file that is stored at the memory. For example, the cluster information may be the cluster information 120 depicted in FIG. 1, the cluster information 220 depicted in FIG. 2, the cluster information 350 depicted in FIG. 3, other cluster information, or any combination thereof. The data file associated with the cluster information may be received from a host device and organized at the memory according to a file system managed at the host device.

Proceeding to 404, the cluster information may be stored such that the cluster information is accessible to the controller but is inaccessible to an external device. For example, the cluster information may be stored at a hidden area of the data storage device or encrypted. The cluster information may include at least one of a cluster map, a cluster table, and a linked list. For example, a linked list of cluster information may include multiple addresses and file access sequencing information related to the multiple addresses. The cluster information may include a portion but not all content of a file allocation table. For example, the cluster information may identify clusters associated with the data files and links indicating a sequence of access to the clusters.

Continuing to 406, the cluster information is accessed to locate at least one region of the memory corresponding to the data file. For example, the cluster information may be accessed by an internal application that is executed at a memory controller, such as the internal application 122 of FIG. 1, the storage device data processing block 254 of FIG. 2, the internal storage application 312 of FIG. 3, another application that is executed at a memory controller, or any combination thereof.

Advancing to 408, data is accessed from the data file at the at least one region of the memory that is identified by the cluster information. For example, where the cluster information identifies a sequence of clusters, the at least one region may correspond to a cluster identified in the cluster information. Accessing the data from the data file may be performed by the controller executing an internal application. The internal application may be executable by the controller to access the data at the memory, to process the accessed data, and to send the processed data to a host device. The accessed data can include audio content, video content, or navigation content.

Moving to 410, the accessed data may optionally be processed at the internal application to generate processed data. Proceeding to 412, the processed data may be provided to an application at an external device, such as to a host application at a host device.

Various types of processing can be performed on the accessed data by the internal application. Processing the data can include decryption of a pre-loaded encrypted data file. To illustrate, the data file associated with the cluster information may be received from a host device and may include encrypted data (e.g. the data file may be encrypted at the host device and written to the data storage device using legacy file write commands). When an application running at an external device that is coupled to the data storage device requests data from the encrypted data file, the application may use data access commands from an instruction set that is compatible with the internal application. For example, the external device may be the host device that wrote the data file to the data storage device, another host device, or another external device. The internal application may authenticate the application at the external device prior to providing decrypted data. After successful authentication, the internal application may decrypt the accessed data during processing of the accessed data at the internal application.

Another type of processing that can be performed on the accessed data is searching the accessed data for a particular data object. For example, the internal application may receive a request that includes a data identifier. The internal application may access requested data from the data file and process the accessed data (including searching the accessed data for the data identifier). For example, the application at the external device may request a map associated with a street name that is included in the data request. When the street name is identified in the accessed data, the internal application may provide a map associated with the street name to the external device. In addition, the data requests can be examined to determine that the requests are authentic, i.e. received from an intended host. For example, where the data requests include sequential requests of maps from geographically distant areas, or of areas having no vehicle access, the internal application may recognize that the requests are not generated by a car navigation system and instead represent an error condition of an unauthorized attempt to read navigation data from the data storage device.

Yet another type of processing that can optionally be performed on the accessed data includes determining if the cluster information incorrectly maps to the data file. At 414, a data request pattern corresponding to at least one data request from a host device may be identified, such as where the data request pattern indicates an error condition. Advancing to 416, when the incorrect mapping is detected, an action may be performed, such as terminating access to the data storage device, disabling the data storage device, and sending spurious data to the host device.

Although various components depicted in FIGS. 1-3 are illustrated as block components and described in general terms, such components may include one or more microprocessors, state machines, or other circuits configured to enable the data storage device 102 of FIG. 1, the storage device of FIG. 2, or the data storage device 302 of FIG. 3 to perform the particular functions attributed to such components, or any combination thereof. For example, the memory controller 106, the internal application 122, or both, of FIG. 1 may represent physical components, such as controllers, state machines, logic circuits, or other structures to enable the data storage device 102 to receive and respond to data requests from a host device or from other external devices to access and process data by using the cluster information 120 stored at the hidden area 118 to locate a requested data object.

For example, the internal application 122 of FIG. 1 may be implemented using a microprocessor or microcontroller programmed to receive requests for data from a data file stored at the storage device, to access cluster information to identify one or more regions of a public area associated with the data file, to retrieve data from the one or more regions, to process the data (e.g. decode or decrypt the data) and to provide the data to the requesting external device or application. In a particular embodiment, the internal application 122 of FIG. 1 includes executable instructions that are executed by a processor and the instructions are stored at the memory 118, 208, or 314, respectively. Alternatively, or in addition, executable instructions that are executed by the processor included in the internal application 122 of FIG. 1 may be stored at a separate memory location that is not part of the memory 118, such as at a read-only memory (ROM) (not shown).

In a particular embodiment, the storage device 102 may be a portable device configured to be selectively coupled to one or more external devices. However, in other embodiments, the storage device may be attached or embedded within one or more host devices, such as within a housing of a portable communication device. For example, the storage device may be within a packaged apparatus such as a wireless telephone, personal digital assistant (PDA), gaming device or console, portable navigation device, or other device that uses internal non-volatile memory.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description. Accordingly, the disclosure and the figures are to be regarded as illustrative rather than restrictive.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method for accessing data at a data storage device, the method comprising:
   in a data storage device with a controller, a memory, and an interface to communicate with a host device, the memory including a data file and cluster information associated with the data file, wherein the cluster information is initially received from the host device or is preloaded onto the data storage device, wherein the cluster information is stored by the controller in a host-inaccessible portion of the memory and the data file is stored in a host accessible portion of the memory, wherein content stored in the host-inaccessible portion cannot be accessed by the host via the interface, and wherein the data storage device does not maintain an internal file system, performing:
      receiving via the interface from the host device, a request to access data; and
      in response to receiving the request:
         retrieving, by the controller, the cluster information from the host-inaccessible portion to locate at least one region of the memory corresponding to the data file, wherein the cluster information identifies a particular set of clusters of a plurality of sets of clusters, and wherein each of the plurality of sets of clusters stores a part of and not an entirety of a file system; and
         accessing, by the controller, the data from the data file at the at least one region of the memory located in accordance with the cluster information.

2. The method of claim 1, wherein the data file is received from the host device and organized at the memory according to a host file system managed at the host device, and further comprising:
   processing the data at an internal application within the controller to generate processed data; and
   providing the processed data to an application at the host device.

3. The method of claim 2, wherein the data file received from the host device includes encrypted data, and wherein processing the data at the internal application includes decrypting the encrypted data.

4. The method of claim 3, wherein the internal application authenticates the application at the host device prior to providing decrypted data to the application.

5. The method of claim 2, further comprising receiving a request that includes a data identifier, and wherein processing the data at the internal application includes searching the data for the data identifier.

6. The method of claim 1, wherein the cluster information includes multiple addresses and file access sequencing information related to the multiple addresses.

7. The method of claim 1, wherein the data includes at least one of audio content, video content, and navigation content.

8. The method of claim 1, wherein an internal application at the data storage device is executable by the controller to access the data at the memory, to process the data, and to send the processed data to the host device.

9. A data storage device comprising:
   an interface;
   a memory including a data file and cluster information associated with the data file, wherein the cluster information is initially received from a host device or is preloaded onto the data storage device, wherein the cluster information is stored by a memory controller in a host-inaccessible portion of the memory and the data file is stored in a host accessible portion of the memory, wherein content stored in the host-inaccessible portion cannot be accessed by the host device via the interface, and wherein the data storage device does not maintain an internal file system; and
   the memory controller coupled to the memory and coupled to the interface, wherein the memory controller is configured, in response to receiving, via the interface, a request to access data, to retrieve the cluster information associated with the data file stored at the memory from the host-inaccessible portion to locate a region of the memory in accordance with the cluster information, wherein the cluster information identifies a particular set of clusters of a plurality of sets of clusters, wherein each of the plurality of sets of clusters stores a part of and not an entirety of a file system, and to execute an internal application to access the data from the data file at the region of the memory.

10. The data storage device of claim 9, wherein the memory controller is further configured to process the data and to send the processed data to the host device in response to receiving a memory request from the host device while the data storage device is operatively coupled to the host device via the interface.

11. The data storage device of claim 10, wherein the memory request identifies a data object but not an address of the data object, and wherein the memory controller is configured to search the region of the memory to locate the data object.

12. The data storage device of claim 10, wherein the memory controller includes a data processor configured to process the data and to send the processed data to the host device.

13. The data storage device of claim 12, wherein the processed data comprises one of decrypted data and decoded data.

14. A system comprising:
a memory controller that is configured to receive cluster information associated with a data file stored at a memory and to store the cluster information in a host-inaccessible portion of the memory without maintaining an internal file system for the memory, wherein the cluster information is initially received from a host device or is preloaded into the memory, wherein content stored in the host-inaccessible portion cannot be accessed by the host device via an interface, wherein the memory controller is further configured, in response to receiving a memory request to access data, to access the cluster information to locate a region of the memory and to access the data from the data file at the region of the memory in accordance with the cluster information, wherein the cluster information identifies a particular set of clusters of a plurality of sets of clusters, wherein each of the plurality of sets of clusters stores a part of and not an entirety of a file system, and wherein an application is executed by the memory controller to access the data from the data file.

15. The system of claim 14, wherein the memory controller is configured to process the data and to send the processed data to the host device.

16. The system of claim 14, wherein the memory controller is configured to decrypt the data.

17. The system of claim 14, wherein the host-inaccessible portion includes a hidden portion of the memory.

18. The system of claim 14, wherein the memory controller is configured to identify a data request pattern corresponding to at least one data request from a host device that indicates an error condition.

19. The data storage device of claim 9, wherein the cluster information is stored by the memory controller to the host-inaccessible portion and wherein the cluster information corresponds to a host file system that is maintained by a host device.

20. The data storage device of claim 9, wherein the memory stores a file allocation table (FAT) including a cluster map, wherein the FAT is accessible to the host device, and wherein cluster data matching a portion but not all of the cluster map is stored in the host-inaccessible portion.

21. The data storage device of claim 20, wherein the cluster information is stored in the host-inaccessible portion upon receipt from the host device when the data file is written to the memory by the host device.

\* \* \* \* \*